(12) United States Patent
Salgado et al.

(10) Patent No.: US 8,085,416 B2
(45) Date of Patent: Dec. 27, 2011

(54) METHOD AND SYSTEM FOR COLOR HIGHLIGHTING OF TEXT

(75) Inventors: David Salgado, Victor, NY (US);
Francois Ragnet, Venon (FR); Alain Franciosa, Meylan (FR); Monica Beltrametti, St. Nazaire les Eymes (FR); Nicolas Monet, Corenc (FR)

(73) Assignee: Xerox Corporation, Norwalk, CT (US)

( * ) Notice: Subject to any disclaimer, the term of this patent is extended or adjusted under 35 U.S.C. 154(b) by 1417 days.

(21) Appl. No.: 11/296,396

(22) Filed: Dec. 8, 2005

(65) Prior Publication Data
US 2007/0133027 A1 Jun. 14, 2007

(51) Int. Cl.
*G06F 3/12* (2006.01)
(52) U.S. Cl. ........................................ 358/1.15
(58) Field of Classification Search ............ 358/1.15
See application file for complete search history.

(56) References Cited

U.S. PATENT DOCUMENTS

| | | | | |
|---|---|---|---|---|
| 5,113,356 | A * | 5/1992 | Nickell et al. | 358/1.8 |
| 5,293,473 | A * | 3/1994 | Hesse et al. | 715/272 |
| 5,649,024 | A * | 7/1997 | Goldsmith | 382/170 |
| 2002/0120849 | A1 * | 8/2002 | McKinley et al. | 713/176 |
| 2003/0042319 | A1 * | 3/2003 | Moore | 235/494 |
| 2004/0227758 | A1 * | 11/2004 | Curry et al. | 345/426 |

OTHER PUBLICATIONS

Bates, Mary Ellen. Copernic Summarizer. Jan. 1, 2004. Online magazine. http://www.accessmylibrary.com/coms2/summary_0286-19913879_ITM.*

* cited by examiner

*Primary Examiner* — Charlotte M Baker
*Assistant Examiner* — Fred Guillermety
(74) *Attorney, Agent, or Firm* — MH2 Technology Law Group LLP

(57) ABSTRACT

In a method of generating hardcopy output, a print job description is provided to a print operation. The print job is in a native format where the print job includes the print operation in the native format and the print job description. A modified print operation is formed in a meta-format in response to the print job description. The modified print operation is submitted in the native format to a print engine to perform the print operation.

21 Claims, 15 Drawing Sheets

METHOD AND SYSTEM FOR COLOR HIGHLIGHTING OF TEXT

FIELD

This invention generally relates to media output. More particularly, the invention relates to a method and system for color highlighting of text without altering the original document and/or file.

DESCRIPTION OF THE RELATED ART

During the workflow of a business day, a user generates output using many applications such as a word processing program. For example, the user may create a document or report for a group meeting. The user may select and highlight portions within the document to emphasize a salient point using the functionality of the word processing application. The user may then submit the document for printing onto a medium, e.g., paper, for distribution at the group meeting.

FIG. 15 illustrates a typical system 1500 utilized by a user to generate a document or report for output on a hardcopy medium, e.g., paper. As shown in FIG. 15, the system 1500 may include an application 1510, a communication interface 1520 and a print engine 1530.

The application 1510 is typically a software program configured to provide functionality of hardcopy output application such as a word processing program, a spreadsheet, a presentation program, etc. The application 1510 may be configured to be executed on a personal computer, a workstation, a network server or some combination thereof through an operating system (not shown).

The application 1510 may be configured to interface with the communication interface 1520. The communication interface 1520 may be configured to provide a communication channel between the application 1510 and the print engine 1530. The communication interface 1520 may be implemented using a printer cable, a network cable, a wireless connection or some combination thereof.

The print engine 1530 may be configured to generate an output onto a physical medium from the print job transmitted by the application 1510. The print engine 1530 may be standalone printer, a network printer, a network copier or some combination thereof. The format of the medium may be paper, acetate or other types of material.

Although using the underlying functionality of applications to highlight text is useful, there are drawbacks and disadvantages. For example, a user may only have a paper copy of the document in his possession. If the user desired to highlight additional text, the user would have to attempt to locate the original electronic document to perform the desired action or the user may have to scan the document back into an electronic format. After locating the document and performing the requisite actions, the user would then have to resubmit the print job to the print engine. This entire process could take a considerable amount of time and thereby reduce the efficiency of the work environment.

SUMMARY

One embodiment pertains to a method of generating hardcopy output. The method includes providing a print job description to a print operation and providing a print job in a native format, wherein the print job includes the print operation in a native format and the print job description. The method also includes forming a modified print operation in a meta-format in response to the print job description and submitting the modified print operation in the native format to a print engine to perform the print operation.

Another embodiment relates to a system for visually enhancing text. The system includes a visual enhancement module configured to receive a print job from an application and modify the print job in response to a print job description. The system also includes a user interface configured to receive selected text and font emphasis for the selected text from a user to build the print job description.

BRIEF DESCRIPTION OF THE DRAWINGS

Various features of the embodiments can be more fully appreciated as the same become better understood with reference to the following detailed description of the embodiments when considered in connection with the accompanying figures, in which.

DETAILED DESCRIPTION OF EMBODIMENTS

Figure 1:
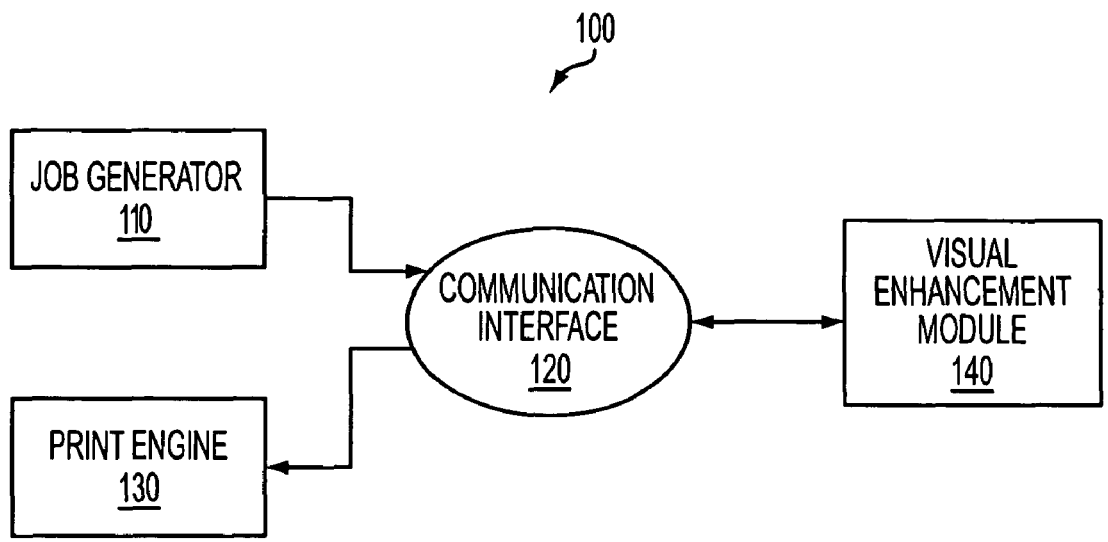
FIG. 1 illustrates an exemplary block diagram of a system in accordance with an embodiment of the invention.

For simplicity and illustrative purposes, the principles of the present invention are described by referring mainly to exemplary embodiments thereof. However, one of ordinary skill in the art would readily recognize that the same principles are equally applicable to, and can be implemented in, all types of printing systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to a method and system for enhancing the readability of a printed document through the use of highlighting (accent) textual items in color/font on the copy of the printed document and without modifying the original document. More particularly, a visual enhancement module may be configured to provide a user the capability to modify the output of a submitted print job (from software means, print media or hardcopy original) to highlight/accent textual items within the print job without modifying the original document in electronic and/or hardcopy format.

The visual enhancement module may include a user interface module, a document parser module, a color highlight engine (CHE), and a document builder module. The user interface module may be configured to provide an interface for a user to specify any enhancements to a submitted print job. More specifically, a user interface may include a graphical user interface (GUI) to provide a user to enter text and to select accent options for the selected textual items. The user interface module may then build a print job description for the submitted print job data stream to the visual enhancement module. In certain embodiments, a copy variation list may be built that provides the capability to permit a user to select the same text in different colors for different sheets of media in the media output. In yet other embodiments, the highlighted text may be consistent throughout the job.

In yet further embodiments, the visual enhancement module may be further configured to highlight based on dictionary, category and summary of the document. More specifically, the visual enhancement module may provide the capability to a user to select a dictionary. The visual enhancement module may place a font emphasis on the terms in the dictionary. The visual enhancement module may also provide a user to select a category option. As an example, when the category option is selected, the visual enhancement module may be configured to search a submitted print job for terms relevant to the selected category and place a font emphasis on those relevant terms in that category. For example, if a date category were selected, all the date text in the document may have a font emphasis placed thereon. The visual enhancement module may further provide a user to select a summary option. The visual enhancement module may process the submitted print job with a summarizer module that determines the key or main ideas of the underlying document. The visual enhancement module may then place a font emphasis on the key ideas as well as generate a summary to be appended to the submitted print job.

The document parser module may be configured to receive a submitted print job data stream and the print job description from the user interface module. The document parser module may be configured to identify any textual elements in the print job. For example, the document parser module may convert an image data into a text data via optical character recognition. The document parser module may then parse the print job data stream in the native language of the print job according to the submitted print job description. The document parser may also be configured to delimitate the color highlighting rules settings within the print job data stream. After processing the job stream, the document parser module may then forward the transformed job stream to the CHE.

The CHE of the visual enhancement module may be configured to bypass any action on un-delimited information contained in the print job data stream. The CHE may also be configured to remove the delimiters and execute its rules processor on any delimited text. For the delimited text, the CHE executes its rules per user's specified settings as set by the print job description. The CHE may be configured to strip out the text delimiters, analyze the text against the highlighting rules, and adds to the print job highlight delimiters where appropriate. For example, the highlighted delimiters may include information on what highlighting color should be applied. The CHE may use a memory buffer for temporary storage of text information as it scans and processes. After processing the job stream, the CHE may forward the document to the document builder module.

The document builder module may be configured to receive the processed print job data stream from the CHE and scan for all highlighted delimiters. For each highlight delimiter, the document building module may incorporate the correct highlighting instruction for its specific job type of job stream. As the process of replacing CHE inserted rules with print engine rules, the document builder returns the print job to the native format of the print engine as it was issued from the submitting application.

FIG. 1 illustrates an exemplary block diagram of a system 100 in accordance with an embodiment of the invention. It should be readily apparent to those of ordinary skill in the art that the system 100 depicted in FIG. 1 represents a generalized schematic illustration and that other components may be added or existing components may be removed or modified.

As shown in FIG. 1, the system 100 includes a print job generator 110, a communication interface 120, a print engine 130 and a visual enhancement module 140. In some embodiments, the print job generator 110 may be an application program such as word processing, a spreadsheet, presentation software application program or other type of similar software application. The print job generator 110 may be executing on a personal computer, workstation, handheld device or other similar type of computing platform (not shown). In yet other embodiments, the print job generator 110 may be a copier, facsimile, or other type of reprographic device that generates output onto a medium, e.g., paper, transparency, etc. A print job data stream may be a file that is in the native format of the print engine, e.g., HPCL™, Postscript™, Adobe™, etc.

The print job generator 110 may also be configured to transmit a print job data stream in the native format of the print engine 130. The print job stream may be formed by the interaction between the job generator 110 and the underlying operating system of the computing platform. For example, a print driver may issue the print job data stream in response to a user initiating a print command in the print job generator 110.

The print job generator 110 may be further configured to interface with the communication interface 110. The communication interface 110 may be configured to provide a communication channel between the job generator 110, the print engine 130 and the visual enhancement module 140 for the transmission of data. The communication interface 110 may be implemented using wired network, wireless network, or a combination thereof. The communication interface 110 may also be a dedicated cable line, local area network, a wide area network or some combination thereof.

The print engine 130 may be configured to generate medium output from the print job data streams transmitted by the job generator 110. The print engine 130 may be standalone printer, a network printer, a network copier, network scanner or some combination thereof. The format of the medium output may be paper, acetate or other types of hard copy of the transmitted output.

The visual enhancement module 140 may be configured to provide a user the capability to modify the print job stream after it transmitted from the job generator 110. More particularly, the visual enhancement module 140 may be configured to provide a user the capability to modify the output of a submitted print job (electronic or print media) to highlight/accent textual items within the print job data stream without modifying the print job from the submitting print job application. In some embodiments, the visual enhancement module 140 may include a user interface to provide the user the capability to search and highlight selected text. In certain other embodiments, the highlighted text may be in different colors, different fonts, or some combination thereof. In yet other embodiments, a user may operate the visual enhancement module 140 from a remote location, e.g., a workstation, a wireless handheld device, or other remote computing platform. In yet further embodiments, the visual enhancement module 140 may provide font emphasis based on a dictionary, a category or a summary option.

Figure 2:
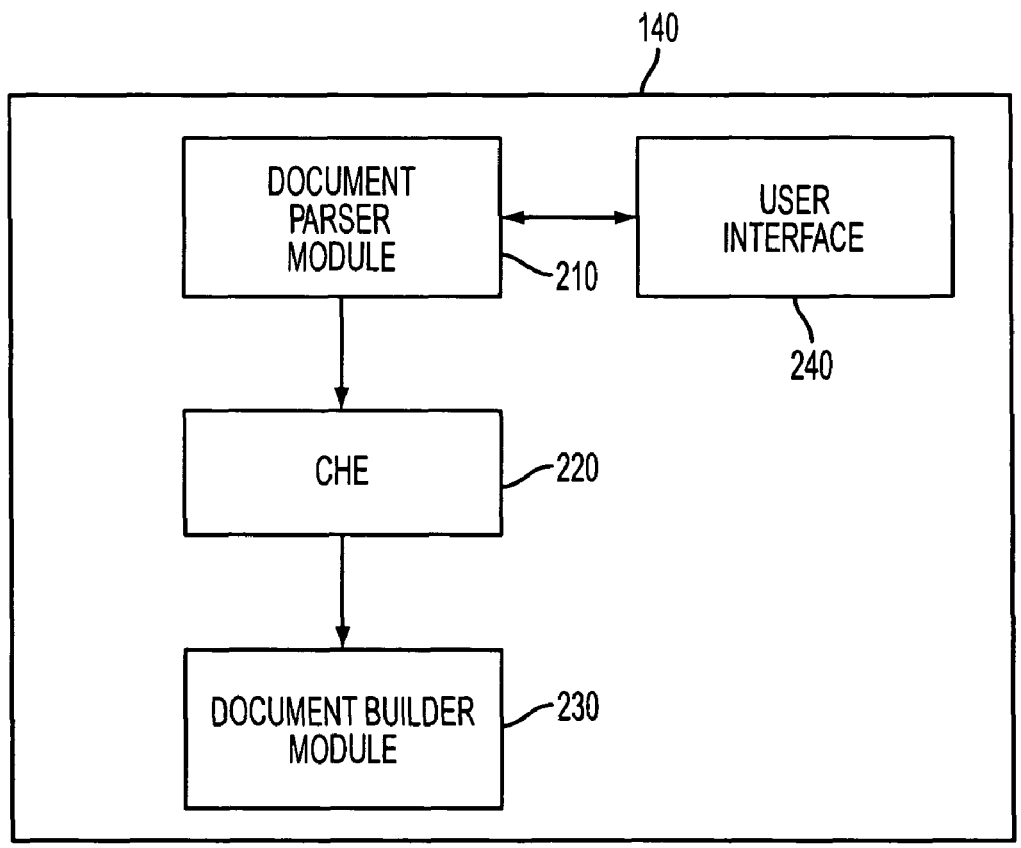
FIG. 2 illustrates an exemplary architecture diagram of the color enhancement engine in accordance with another embodiment of the invention.

FIG. 2 illustrates a more detailed architecture block diagram 200 of the visual enhancement module 140 (shown in FIG. 1) in accordance with an embodiment of the invention. It should be readily apparent to those of ordinary skill in the art that the diagram 200 depicted in FIG. 2 represents a generalized schematic illustration and that other components may be added or existing components may be removed or modified.

As shown in FIG. 2, the visual enhancement module 140 may include a document parser module 210, a color highlighting engine 220, and a document builder module 230. In other embodiments, the visual enhancement module 140 may include a user interface module 240.

The document parser module 210 may be configured to receive a print job data stream and a print job description that modifies the print job stream. The print job data stream may be generated from a software application. For hardcopy originals, a scanner may be used to generate the print job data stream in one embodiment. The print job description may be generated by the user through a remote application in another embodiment. In yet other embodiments, the print job description may be generated by the user through the user interface 240.

The document parser module 210 may also be configured to delimitate the text elements (or portions) in the print job description. For scanned versions of hardcopy originals, the document parser module 210 may convert the image file into a text file using optical character recognition techniques. The document parser module 210 would then process the text file. The document parser module 210 may also delimitate the any rules for font emphasis, e.g., highlighting, in the print job description. The delimitated text and rules in the print job data stream are then forwarded to the color highlighting engine 220.

The color highlighting engine 220 may also be configured to extract and load the rules (or actions, highlighting, etc.) associated with the print job description. In some embodiments, rules associated with a print job description may relate to any user-specified text, a color for the user-specified text, or some other modification to the font of the text. For example, a user may have selected to highlight the term "Fourth Quarter Results" in a yellow color may be considered two rules: yellow color and "Fourth Quarter Results" in some embodiments.

The color highlighting engine 220 may be further configured to parse the print job data stream in response to any loaded rules. For the appropriate text, the color highlighting engine 220 may delimitate any color highlighting rule and any selected text as specified in the print job description.

The color highlighting engine 220 may parse the delimitated print job data stream and to execute a rules executor on the delimitated text and rules. In some configurations, the color highlighting engine 220 may skip any non-delimitated text and process any delimitated text by inserting highlight delimiters where appropriate per the rules associated with the print job description. The highlight delimiters may, in some embodiments, include the color, font emphasis, or other similar highlighting feature information. Subsequently, the color highlighting engine 220 may generate a color highlighted print job description in a meta-format, which is then forwarded to the document builder module 230.

The document builder module 230 may be configured to receive the color highlighted print job stream from the color highlighting engine 220 and scans the print job stream for all highlighted delimiters. For each highlighted delimiters, the document builder module 230 may be configured to incorporate the correct highlighting instruction for a print engine (e.g., see print engine 130, FIG. 1) in the native format of the print engine. Subsequently, the document builder module 230 forwards the print job stream in the native format of the print engine for outputting on a hardcopy medium.

In some embodiments, the visual enhancement module 140 may include a user interface module 240. In some embodiments, the user interface module 240 may provide a mechanism for a user to select the text to highlight, any font emphasis (e.g., italics, bold, underline, etc.), any color associated with the selected text, individual copies for colors and/or text, or some combination thereof. For some embodiments, e.g., a network copier, the user interface module 240 may be accessed using the interface of the network copier. In yet other embodiments, the user interface module 240 may be a remote computer application that may be accessed by users.

Figure 3:
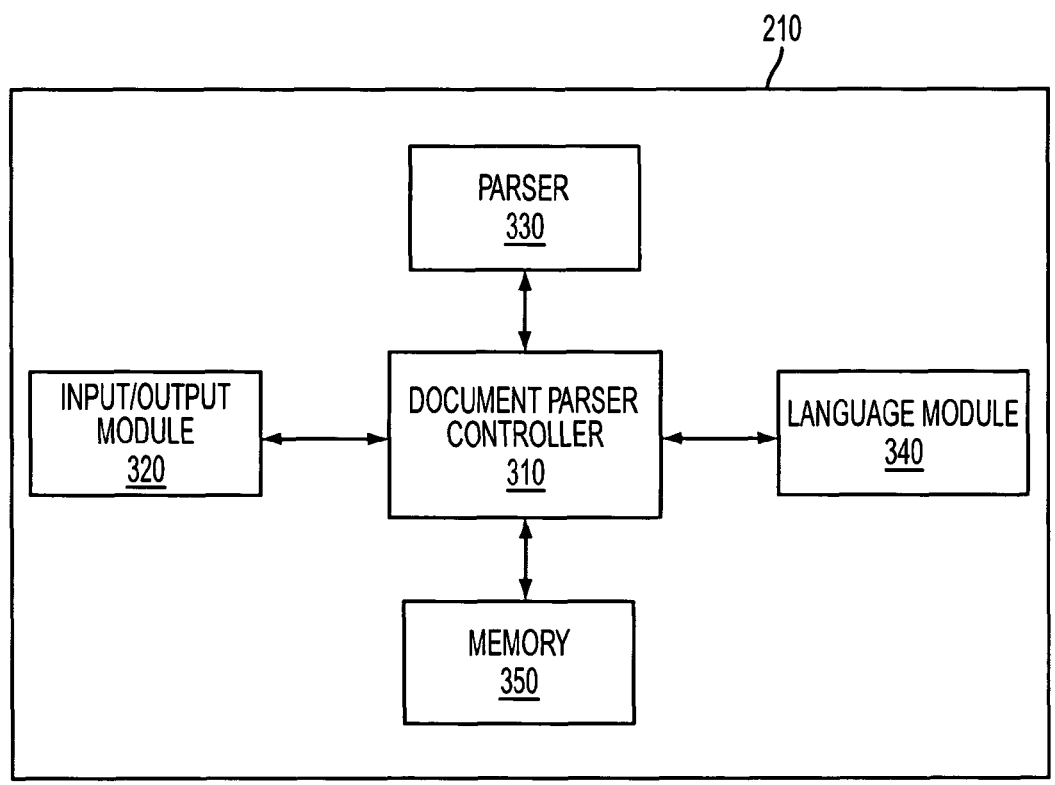
FIG. 3 illustrates a block diagram of the document parser module in accordance with yet another embodiment of the invention.

FIG. 3 illustrates a block diagram of the document parser module 210 in accordance with yet another embodiment of the invention. It should be readily apparent to those of ordinary skill in the art that the document parser module 210 depicted in FIG. 3 represents a generalized schematic illustration and that other components may be added or existing components may be removed or modified.

As shown in FIG. 3, the document parser module 210 may include a document parser controller 310, an input/output (I/O) module 320, a parser 330, and a language module 340. The document parser controller 310 may be configured to manage the functionality of the document parser module 210.

The document parser controller 310 may also be configured to interface with the I/O module 320. The I/O module 320 may be configured to receive print job streams and/or print job descriptions and to forward modified (e.g., delimitated) print job descriptions to the color highlighting engine 220.

The document parser controller 310 may be further configured to interface with the parser 330. The parser 330 may be configured to parse through the received print job stream. The parser 330 may be invoked as a software application, a function call, or other similar invocation mechanism.

The document parser controller 310 may be further configured to interface with the language module 340. The language module 340 may be configured to provide a mechanism to coordinate incoming print job data streams with the appropriate print engine. For example, in a typical office setting, the print engine may be a standalone printer, a network printer, a network copier, a scanner or other device capable of producing hardcopy output. The language module 340 may provide a means to support the parsing of the print job stream with the parser 330. In some embodiments, the language module 340 may contain information to support a print job stream like Postscript™, PDF™, PCL™, or other type of print engine language.

Although the I/O module 320, the parser 330, the language module 340, and memory 350 are illustrated as separate components, it should be readily obvious to those skilled in the art that the functionality incorporated by these components may be incorporated into the document parser controller 310 in other embodiments. In yet other embodiments, document parser module 320 may be implemented using software, hardware or combinations thereof.

In some embodiments, the document parser controller 310 may include a memory 350. The memory 350 may be configured to provide temporary storage for the processing performed by the document parser controller 310.

Figure 4:
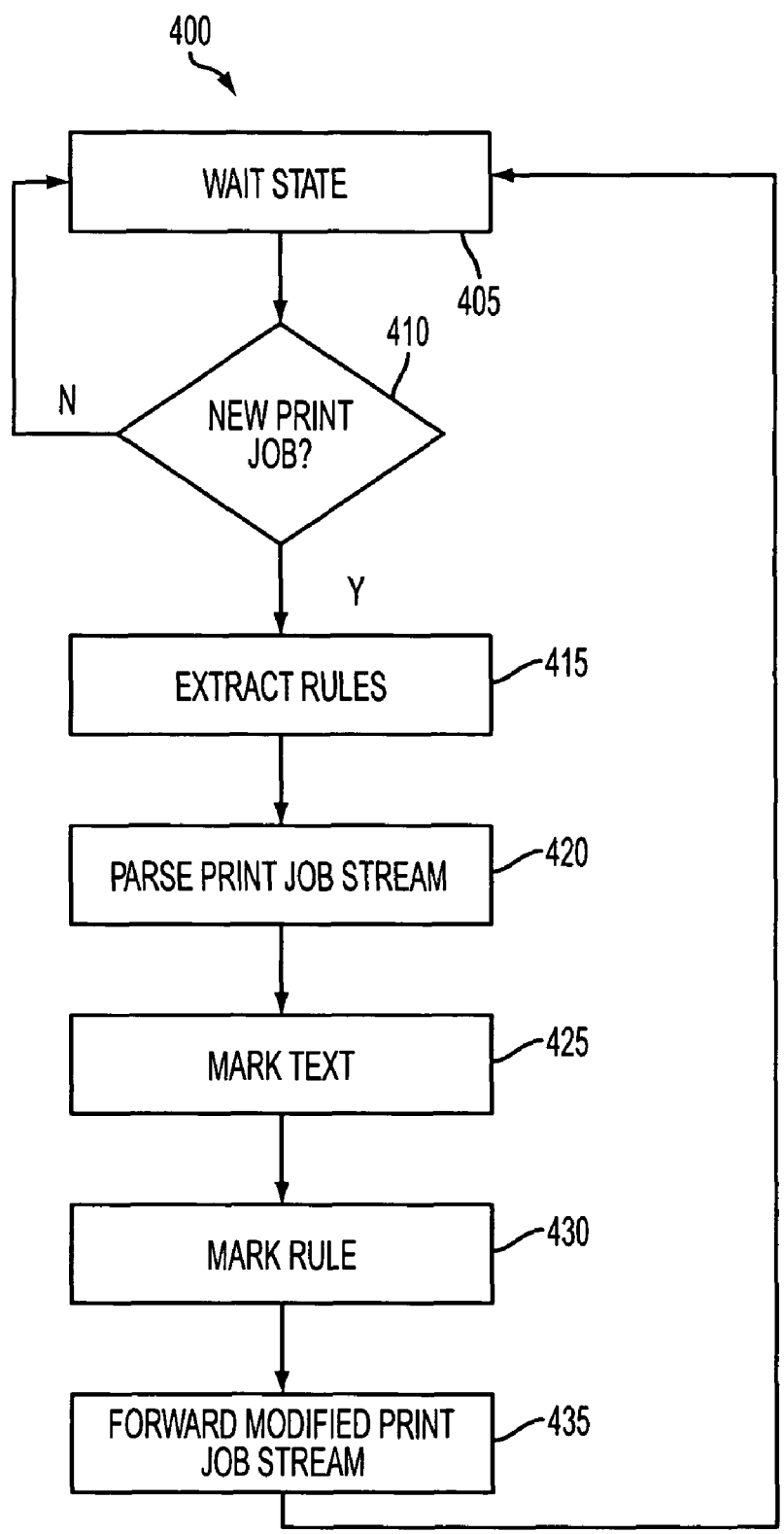
FIG. 4 illustrates a flow diagram implemented by the document parser manager module in accordance with yet another embodiment.

FIG. 4 illustrates a flow diagram 400 implemented by the document parser controller 310 in accordance with yet another embodiment. It should be readily apparent to those of ordinary skill in the art that the flow diagram 400 depicted in FIG. 4 represents a generalized illustration and that other steps may be added or existing steps may be removed or modified.

As shown in FIG. 4, the document parser controller 310 may be configured in a wait state, in step 405. In some embodiments, the document parser controller 310 may have been invoked and waiting for print job streams and print job descriptions.

In step 410, periodically or based on event, the document parser controller 310 may check whether a new print job stream has arrived from a print job generator. For example, the print job stream may be output from a software application or may be an image file of a document. If the document parser controller 310 determines that a print job has not arrived, the document parser controller 310 may return to the wait state of step 405.

Otherwise, the document parser controller 310 has determined a print job stream has arrived through the I/O module 320. In some embodiments, the print job stream may be temporarily stored in the memory 350.

In step 415, the document parser controller 310 may be configured to extract any rules associated with the print job description. The document parser controller 310 may be configured to store the extracted rules in memory 350. Any rules extracted from the print job description may then be accessed by the parser 330.

In step 420, the document parser controller 310 may be configured to parse the print job stream. More particularly, the document parser controller 310 may be configured to select a portion of the received print job data stream.

In step 425, the document parser controller 310 may be configured to search the print job stream to mark (or delimitate) text. More particularly, the document parser controller 310 may search for relevant text as specified by any of the extracted rules associated in the print job description.

In step 430, the document parser controller 310 may also be configured to search the print job stream to insert the appropriate rule and delimitate the rule. In some embodiments, steps 425 and 435 may be executed simultaneously by the document parser controller 310. In yet other embodiments, the order of the steps 425 and 435 may be reversed.

In step 430, the document parser controller 310 may be configured to forward the modified print job stream to the color highlighting engine 220. Subsequently, the document parser controller 310 returns to the wait state of 405.

Figure 5:
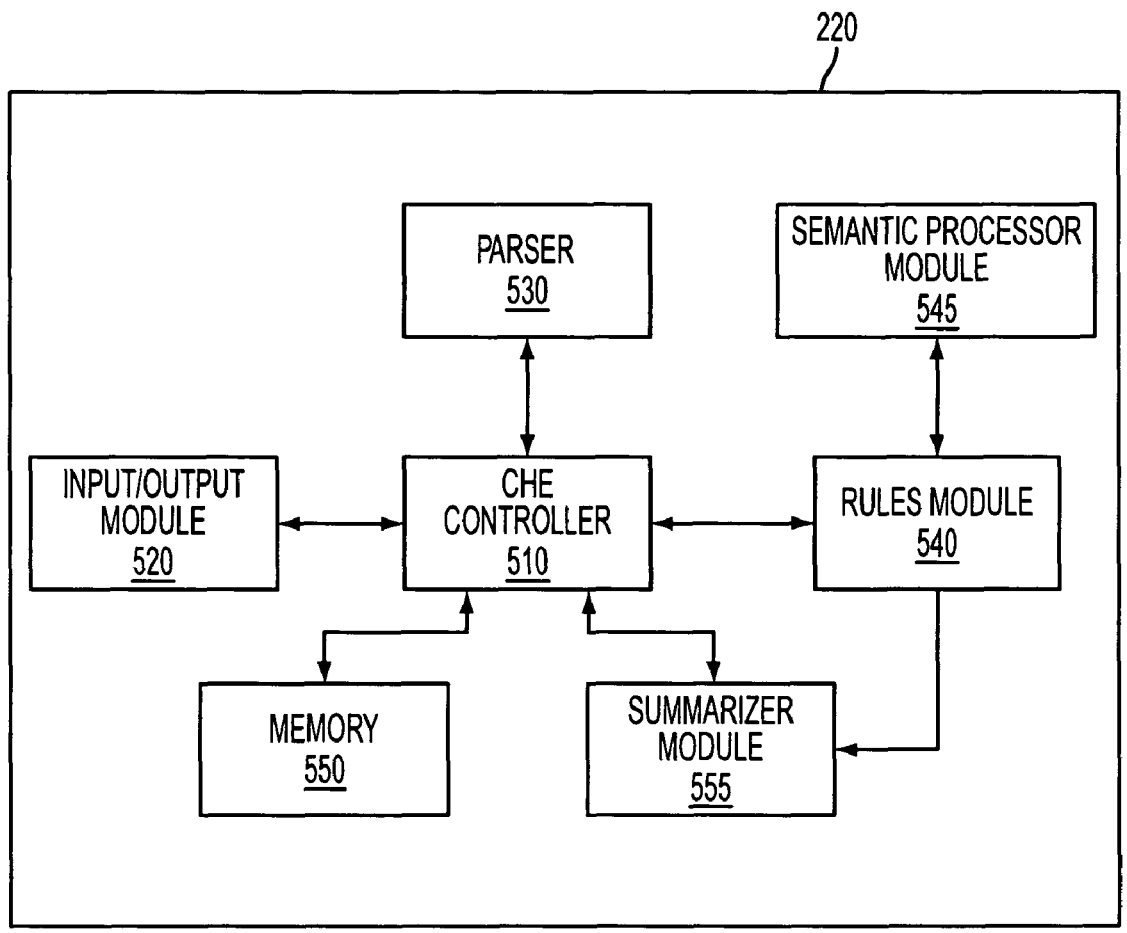
FIG. 5 illustrates a block diagram of the color highlighting engine in accordance with yet another embodiment of the invention.

FIG. 5 illustrates a block diagram of the color highlighting engine 220 in accordance with yet another embodiment of the invention. It should be readily apparent to those of ordinary skill in the art that the color highlighting engine 220 depicted in FIG. 5 represents a generalized schematic illustration and that other components may be added or existing components may be removed or modified.

As shown in FIG. 5, the color highlighting engine 220 may include a color highlighting engine controller 510 (labeled CHE controller 510, in FIG. 5), an input/output (I/O) module 520, a parser 530, a rules executor module 540, a semantic processor 545, a memory 550, and a summarizer module 555.

The CHE controller 510 may be configured to provide the management, functionality and operation of the CHE controller 510. More particularly, the CHE controller 510 may manage the processing of the print job stream data according to any highlighting rules specified by the print job description.

The CHE controller 510 may also be configured to interface with the I/O module 520. The I/O module 520 may be configured to receive print job data streams and/or print job descriptions and to forward modified (e.g., delimitated) print job descriptions to the document builder module 230.

The CHE controller 510 may be further configured to interface with a parser 530. The parser 530 may be configured to parse through print job data stream according to the rules executor module 540. The parser 530 may be invoked as a software application, a function call, or other similar invocation mechanism.

The CHE controller 510 may be further configured to interface with the rules executor module 540. The rules executor module 540 may be configured to insert the appropriate result of rule into a print job description in a meta-format (or meta-language). For example, if the text is "Xerox" highlight it in blue, then the insertion comprises of "highlight in blue." Continuing on with the example, the meta-format would consist of the type of emphasis and information relevant to that type of emphasis. As a non-limiting example, for "highlight in blue" would then be <emphasis=highlight, color=blue>. Other font emphasis may be <emphasis=italics>, <emphasis=underlining>, or other similar effects.

The rule executor module 540 may also be configured to interface with the semantic processor 545. The semantic processor 545 may be configured to extract knowledge (relevance, meaning, etc.) from text. The semantic processor 545 may be used in the category highlighting as described in greater detail below. In one embodiment, category highlighting provides the capability of searching for relevant terms in a category. For example, a financial category may include terms for assets, financial numbers, losses, or other similar type of financial information. A document may contain page numbers which have to be distinguished from sales figures. Accordingly, the semantic processor 545 provides a mechanism for the CHE 220 to differentiate between a page number and a financial number. The semantic processor 545 provides a set of rules for the rules executor module 540 in response to a selection of a category from a user. The semantic processor 545 may also be configured to interface with the CHE controller 510.

The CHE controller 510 may be further configured to interface with the memory 550 that may be configured to provide non-persistent storage for the processing of the print job data stream and print job description. The CHE controller 510 may, in effect, use the memory 550 as a scratch pad for the processing of the received print job data streams.

The CHE controller 510 may be yet further configured to interface with the summarizer module 555 that is configured to determine the key/main concepts associated with the print job data stream. Moreover, the summarizer module 555 may be configured to append a summary or abstract of the key/main ideas to the document. The summarizer module 555 may use statistical and linguistic algorithms to accomplish the identification of key/main ideas. The summarizer module 555 may be implemented using technology from Inxight, Pertinence, Copernic, Intellexer, open source consortiums, or other similar companies.

Figure 6A:
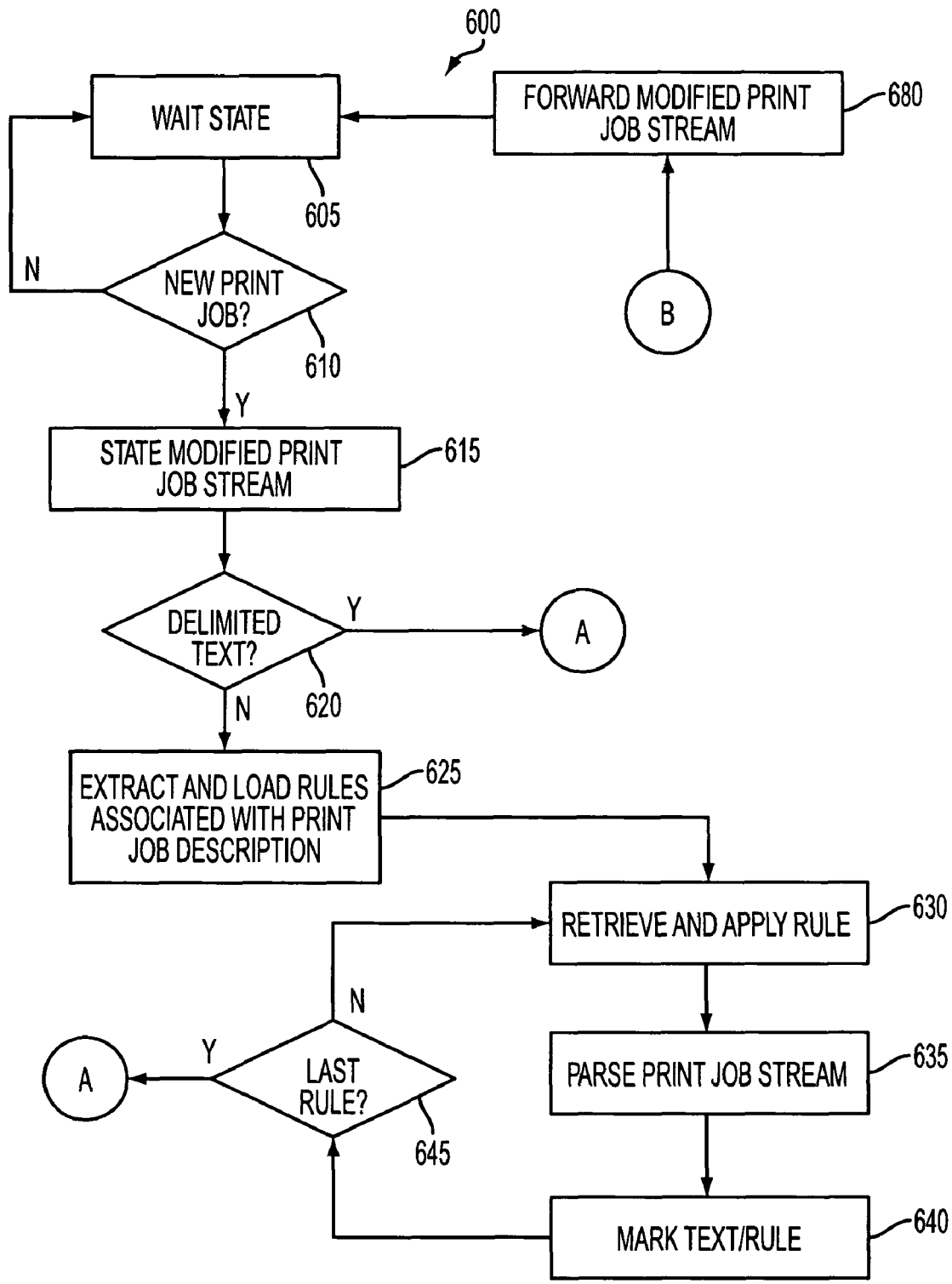
FIGS. 6A-B illustrate a flow diagram implemented by the CHE module in accordance with yet another embodiment.
Figure 6B:
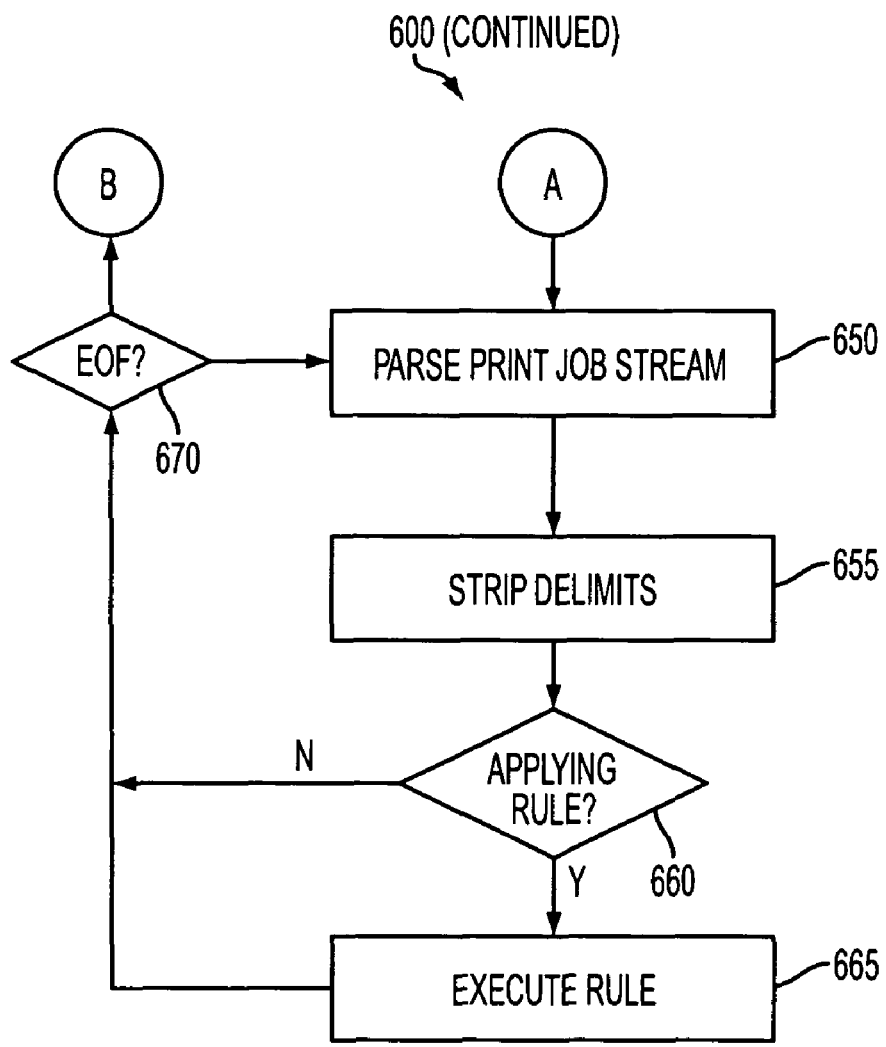
Figure 6C:
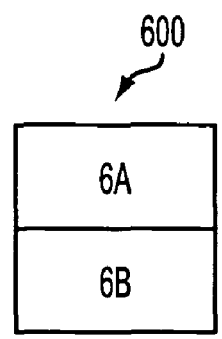
FIG. 6 is a key to FIGS. 6A-B.

FIG. 6 illustrates a flow diagram 600 implemented by the CHE module 220 in accordance with yet another embodiment. It should be readily apparent to those of ordinary skill in the art that the flow diagram 600 depicted in FIG. 6 represents a generalized illustration and that other steps may be added or existing steps may be removed or modified.

As shown in FIG. 6, the CHE controller 510 may be in wait state, in step 605. The CHE controller 510 may have been invoked and is waiting for a print job data stream to process from the document parser module 210. In some embodiments, the CHE controller 510 may be invoked in response to the arrival of the print job data stream and print job description.

In step 610, the CHE controller 510 may be configured to determine whether a print job description and a print job data stream arrived from the document parser module 210. If the data has not arrived from the document parser module 210, the CHE controller 510 may be configured to return to the wait state of step 605.

Otherwise, if the CHE controller 510 determines that a print job data stream and a print job description has been forwarded thereto, the CHE controller 510 may be configured to temporarily store the received print job stream in the memory 550.

In step 620, the CHE controller 510 may be configured to determine whether the modified print job stream contains any delimited text. More specifically, the CHE controller 510 may invoke the parser module 530 to search the modified print job stream. In some embodiments, the document parser module 220 may not be configured to parse the print job stream to search for selected text and insert rules for font emphasis. For these configurations of the visual enhancement module 140, the CHE module 230 may be configured to perform these functions.

Accordingly, if the CHE controller 510 determines that the print job stream contains delimited text, the CHE controller 510 proceeds to the processing of step 650 (See FIG. 6B). Otherwise, if the CHE controller 510 determines that the print job does not include any delimited text, the CHE controller 510 may be configured to extract any user-specified rules associated with the print job, in step 625. The CHE controller 510 may then load any extracted rules into its rules executor module 540.

In step 630, the CHE controller 510 may be configured to retrieve a rule from the rules executor module 540. In step 635, the rules executor module 540 may invoke the parser module 530 to parse the print job stream to mark (or delimitate) text by invoking the parser module 530, in step 640. More particularly, the CHE controller 510 may search for relevant text as specified by the rule extracted. For the relevant text, the CHE controller 510 delimitates the text as well as inserts the rule for the relevant text.

In step 645, the CHE controller 510 may be configured to determine whether the last rule has been executed by the rules executor module 540. For example, in one embodiment, when the rules were loaded into the rules executor module 540, a counter may be set that tracks the number of rules associated with the print job. Accordingly, if the counter is not reset, the CHE controller 510 may determine that the last rule has not been executed and the CHE controller returns to the processing of step 630. Otherwise, if the last rule as been executed, the CHE controller may proceed to the processing of step 650 (see FIG. 6B).

Referring to FIG. 6B, in step 650, the CHE controller 510 may be configured to parse the modified print job data stream. More particularly, the CHE controller 510 may invoke the parser module 530 to search for delimitated text.

For the delimitated text, the CHE controller 510 may be configured to strip (or remove) the delimits (e.g., "//") from the print job data stream, in step 655. Subsequently, in step 660, the CHE controller 510 may be configured to execute its rules executor module 540 to determine if a rule needs to be applied.

If the CHE controller 510 determines that a rule needs to be applied, the CHE controller may be configured to execute the rule in step 665. More specifically, the CHE controller inserts information in the meta-language to indicate the course of action for the document builder module 230. For example, if the text is "Xerox" highlight it in blue, then the insertion comprises of "highlight in blue."

Otherwise, returning to step 660, if the CHE controller 510 determines that a rules does not apply, the CHE controller 510 may determine whether the end of file has been reached in step 670. If the CHE controller 510 determines that additional processing is required, the CHE controller 510 returns to the processing of step 650. Otherwise, the CHE controller 510 may forward the modified print job data stream to the document builder module 230, in step 680 (See FIG. 6A).

Figure 7:
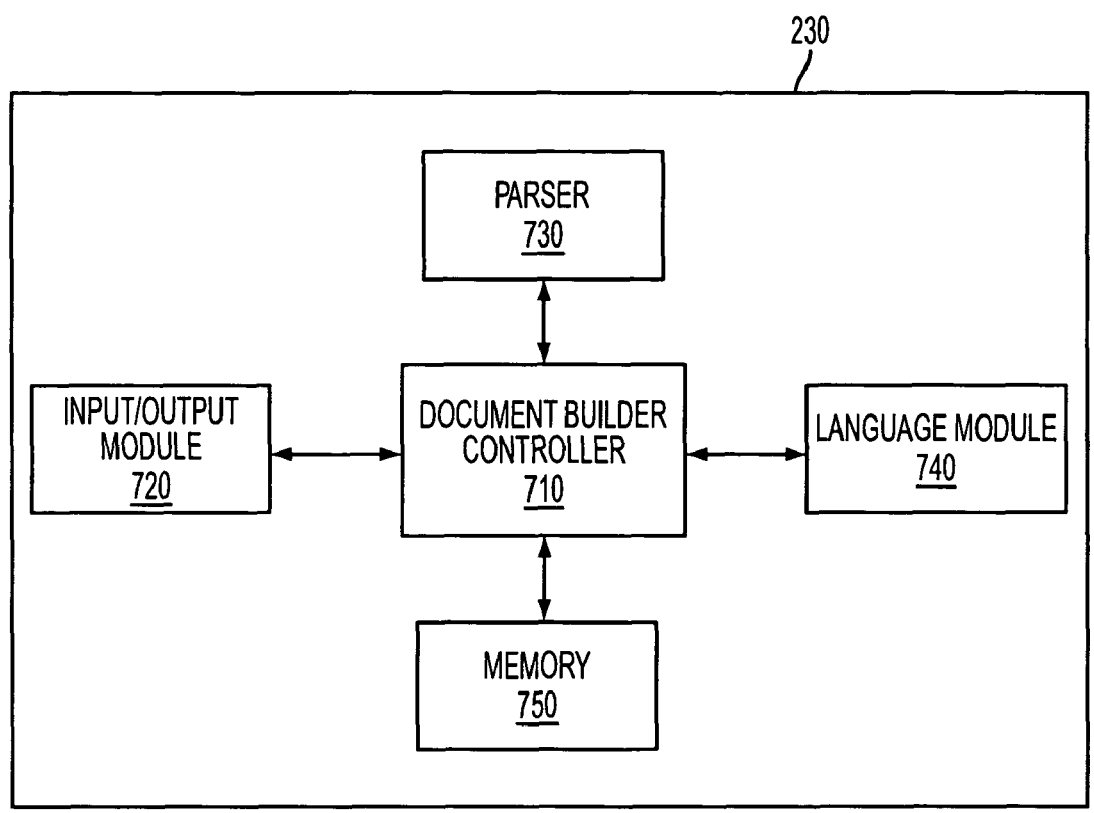
FIG. 7 illustrates a block diagram of the document builder module in accordance with yet another embodiment of the invention.

FIG. 7 illustrates a block diagram of the document builder module 230 in accordance with yet another embodiment of the invention. It should be readily apparent to those of ordinary skill in the art that the document builder module 230 depicted in FIG. 7 represents a generalized schematic illustration and that other components may be added or existing components may be removed or modified.

As shown in FIG. 7, in some embodiments the document builder module 230 may include a document builder controller 710, an input/output module 720, a parser 730, a language module 740, and a scratchpad 750.

The document builder controller 710 may be configured to provide the management, functionality and operation of the document builder module 230. More particularly, the document builder controller 710 may manage the processing of the print job data stream according to any highlighting rules specified by the print job description. In some embodiments, the document builder controller 710 may be implemented in software and in other embodiments as a hardware device (e.g., an application specific integrated circuit, an FPGA, etc.). In yet other embodiments, the document builder controller 710 may be implemented as a combination of hardware and software components.

The document builder controller 710 may also be configured to interface with the I/O module 720. The I/O module 720 may be configured to receive print job streams and/or print job descriptions and to forward modified (e.g., delimitated) print job descriptions to the document builder module 230.

The document builder controller 710 may be further configured to interface with a parser 730. The parser 730 may be configured to parse through print job stream. The parser 730 may be invoked as a software application, a function call, or other similar invocation mechanism.

The document builder controller 710 may be further configured to interface with the language module 740. The language module 740 may be configured to convert any CHE inserted rules to the appropriate rule in the native format of the print engine.

The document builder controller 710 may be further configured to interface with a scratchpad 750. The scratchpad 750 may be configured to provide non-persistent storage for the processing of the print job data stream and print job description.

Figure 8:
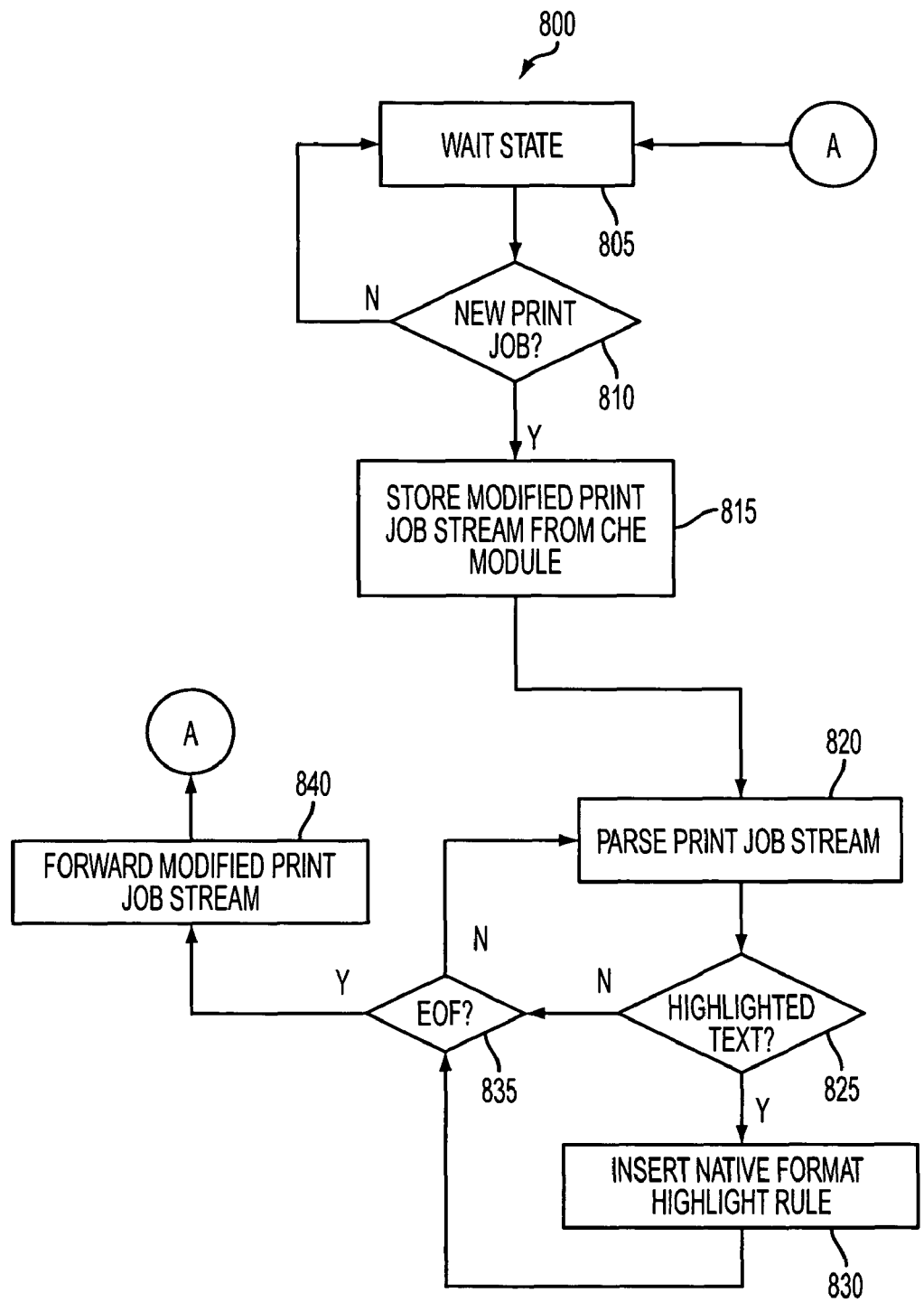
FIG. 8 illustrates a flow diagram implemented by the document builder module in accordance with yet another embodiment.

FIG. 8 illustrates a flow diagram 800 implemented by the document builder module 230 in accordance with yet another embodiment. It should be readily apparent to those of ordinary skill in the art that the flow diagram 800 depicted in FIG. 8 represents a generalized illustration and that other steps may be added or existing steps may be removed or modified.

As shown in FIG. 8, the document builder controller 710 may be configured to be in a wait state, in step 805. The document builder controller 710 may have been invoked by the user by activating a menu command, a dialog button, or a command prompt. In some embodiments, the document builder module 230 may be invoked in response to an event.

In step 810, the document builder controller 710 may be configured to determine whether a print job data stream has arrived from the CHE engine 220. For example, the document builder controller 710 may determine whether the print job data stream has arrived through the I/O module 720. As another example, the document builder controller 710 may include semaphores that when set indicate the arrival of a print job data stream from the CHE module 220.

If the document builder controller 710 determines that a print job data stream has not arrived, the document builder controller 710 may be configured to return to the wait state of step 805. Otherwise, if the document builder controller 710 determines that a print job data stream in the meta-format has arrived from the CHE module 230, the document builder controller 710 may be configured to store the print job data stream in the meta-format in the scratchpad 750 for further processing as described above and in further detail below.

In step 820, document builder controller 710 may be configured to parse the print job data stream using the parser 730. More particularly, the document builder controller 710 may parse a section of the print job data stream for highlighted text. In step 825, the document builder controller 710 may search the print job data stream for text highlighted by the CHE 220. If the document builder controller 710 determines that no highlighted text in the captured section, the document builder controller 710 may determine whether the end of the file has been reached in step 835. If the end of the file has been reached, the document builder controller 710 may be configured to send the print job stream to the print engine for output onto a hardcopy medium. The document builder controller 710 may then return to the wait state of 805. Otherwise, the document builder controller 710 may return to the processing of step 820.

Returning to step 825, if the document builder controller 710 determines that the parsed section contains highlighted text, the document builder controller 710 may replace the CHE highlighted rule and text with the native format rule and text of the print engine, in step 830. Subsequently, the document builder controller 710 may return to the processing of step 835.

Figure 9:
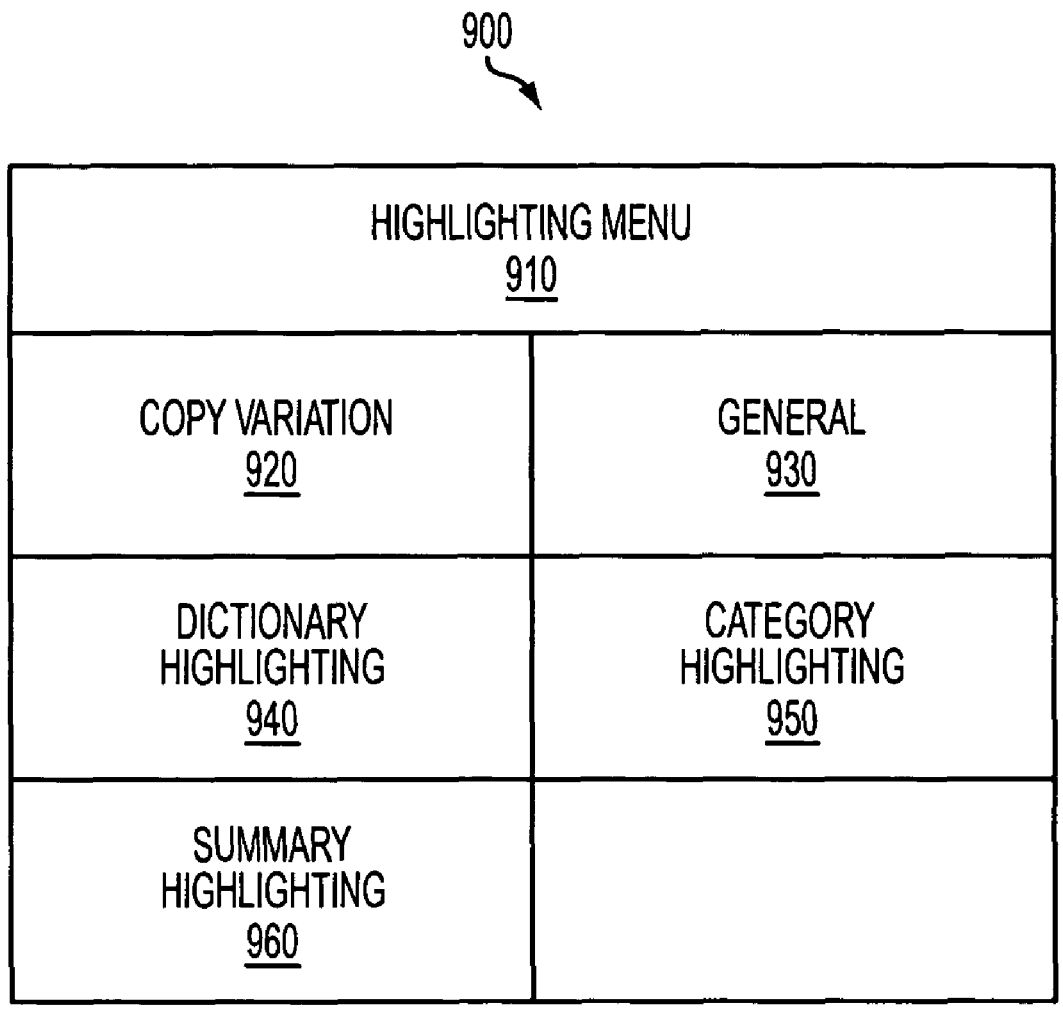
FIG. 9 illustrates an exemplary user interface screen in accordance with yet another embodiment of the invention.

FIG. 9 illustrates an exemplary user interface screen in accordance with yet another embodiment of the invention. It should be readily apparent to those skilled in the art that FIG. 9 is a generalized illustration and that existing components may be modified or removed and additional components added.

As shown in FIG. 9, a user interface 900 includes a title menu 910, a copy variation submenu 920, a general submenu 930, a dictionary highlighting submenu (option) 940, a category highlighting submenu 950, and a summary highlighting submenu 960. The title menu 910 may indicate the functionality provided by user interface 900. More particularly, user interface 900 may provide the capability for a user to enter selected text to highlight in color and/or in font. The user may activate the general submenu 930 to accomplish these tasks.

The user interface 900 may also provide the capability for the user to build a copy variation list in some embodiments. More specifically, a user may specify color and font for a first selected text for a first copy, specify a different color and font for a second selected text for a second copy, and so on. In these embodiments, the user may activate the copy variation submenu 920 to accomplish these tasks.

The user interface 900 may further provide the capability for the user to place a font emphasis based on a dictionary. When dictionary highlighting 940 is activated, the terms contained in a dictionary are inputted to the rules executor module 540 as a rule(s) along with the appropriate font emphasis. Accordingly, a user may use this option as a "short-cut" method for placing a font emphasis on common terms.

The user interface 900 may further provide the capability for the user to place a font emphasis based on a category. When the user activates category highlighting 950, terms relevant to a category are searched for in the submitted print jobs based on a semantic processor. The relevant terms are placed in the rules executor module 540 as well as the appropriate rule for processing by the color highlighting engine 220.

When the user activates summary highlighting 960 on the user interface 900, a summarizer module is invoked to search the submitted print job for main or key ideas. The terms defining the key ideas are inputted as rules into the rules executor module 540 as well as the appropriate font emphasis for further processing by the color highlighting engine 220.

Figure 10:
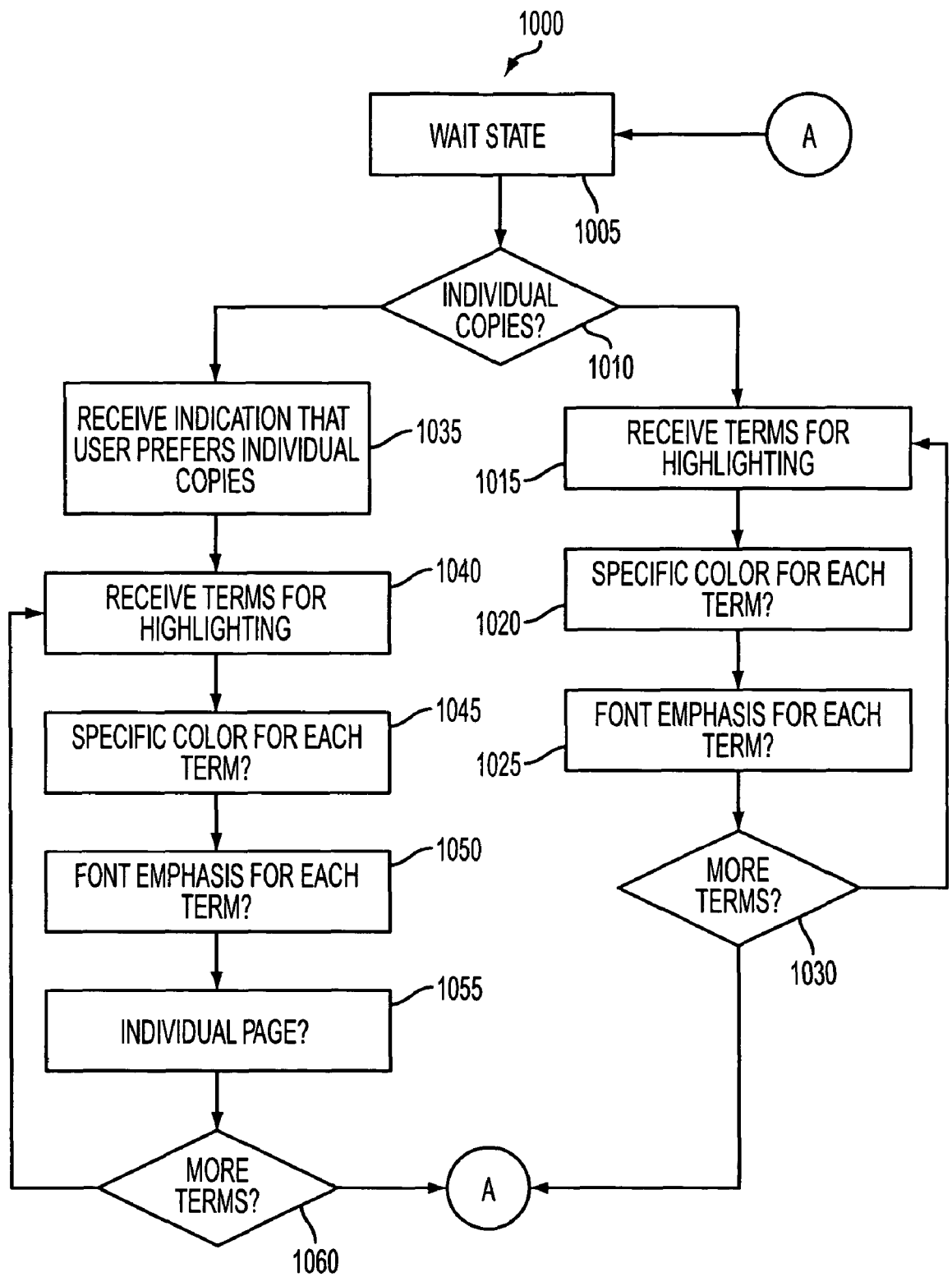
FIG. 10 illustrates a flow diagram for an embodiment of the user interface shown in FIG. 9.

FIG. 10 illustrates a flow diagram 1000 for an embodiment of the user interface shown in FIG. 9. It should readily apparent to those skilled in the art that FIG. 10 is a generalized illustration and that other steps may be added or existing steps may be removed or modified.

As shown in FIG. 10, the user interface 900 may be in a wait state, in step 1005. In some embodiments, the user interface 900 may be executing in a print engine such as a network copier, a scanner, a facsimile, a computer, a handheld device, or other similar computing platform.

In step 1010, the user interface 900 may determine whether the individual submenu 920 or the general submenu 930 has been activated by a user. If the user has activated the general submenu, the user interface 900 may be configured to display another user interface to allow a user to enter selected text for highlighting, in step 1015. For example, the selected text may be entered through a touch screen, a keyboard or other type of interface. The selected text may then be store in a memory.

In step 1020, the user interface 900 may be configured to query the user to select a color for the entered text. In one embodiment, another user interface may be generated to display a palette of colors for the user to associate with the selected text.

In step 1025, the user interface may be configured to query the user to select a font emphasis (e.g., underline, italics, etc.) for the selected text. In some embodiments, the user interface 900 may generate yet another user interface to provide a list of font emphasis selections.

In step 1030, the user interface 900 may query the user whether he has additional terms to highlight. If the user has additional terms to highlight, the user interface 900 may be configured to return to the processing of step 1015. Otherwise, the user interface 900 may be configured to package the user-entered information into a print job description.

Returning to step 1010, if the user has activated the individual submenu 900, the user interface 900 may be configured to build a copy variation list in step 1035. The copy variation list provides the capability to tailor specific copies of the document for individuals.

In step 1040, the user interface 900 may be configured to display another user interface to allow a user to enter selected text for highlighting. For example, the selected text may be entered through a touch screen, a keyboard or other type of interface. The selected text may then be stored in a memory as additional processing occurs.

In step 1045; the user interface 900 may be configured to query the user to select a color for the entered text. In one embodiment, another user interface may be generated to display a palette of colors for the user to associate with the selected text.

In step 1050, the user interface 900 may be configured to query the user to select a font emphasis (e.g., underline, italics, etc.) for the selected text. In some embodiments, the user interface 900 may generate yet another user interface to provide a list of font emphasis selections.

In step 1055, the user interface 900 may be configured to query the user that the selected highlighted text belongs to an individual copy. In step 1060, the user interface 900 may query the user whether he has additional terms to highlight. If the user has additional terms to highlight, the user interface 900 may be configured to return to the processing of step 1040. Otherwise, the user interface 900 may be configured to package the user-entered information into a print job description.

Figure 11:
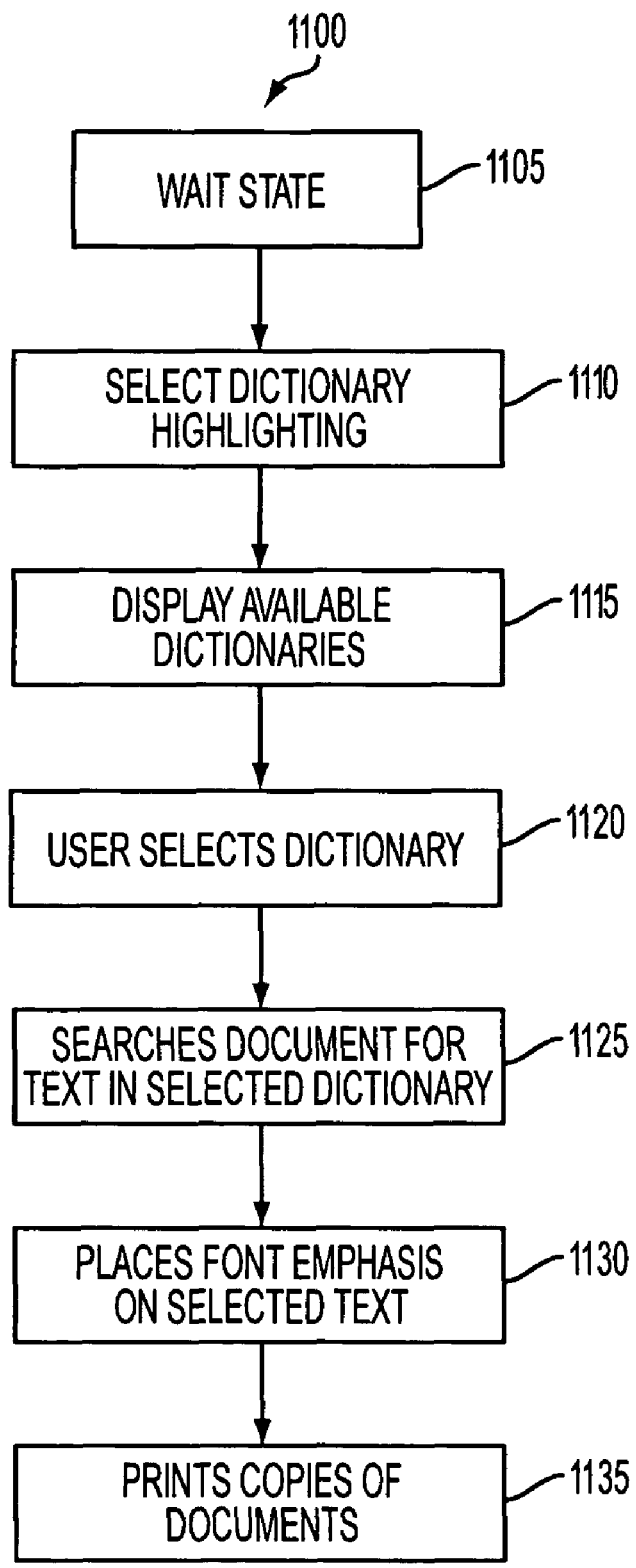
FIG. 11 illustrates another flow diagram for an embodiment of the user interface shown in FIG. 9.

FIG. 11 illustrates another flow diagram for an embodiment of the user interface shown in FIG. 9. It should readily apparent to those skilled in the art that FIG. 11 is a generalized illustration and that other steps may be added or existing steps may be removed or modified.

In yet another embodiment, a user may use a dictionary feature in accordance with yet another embodiment of the invention. More particularly, dictionaries may be created for users. Each dictionary contains a list of pre-determined terms that are relevant for the dictionary. For example, a financial dictionary may contain terms such as asset, financial performance, debit, credit, sales, etc. The terms for the dictionary may be predefined. However, in other embodiments, a user may create their own dictionary. Thus, when a dictionary is selected, the dictionary terms are searched for in a document. For the matching terms in the document, a font emphasis, e.g., bolding, highlighting, etc., is placed on the matching terms.

As shown in FIG. 11, the user interface 900 may be in a wait state, in step 1105. In some embodiments, the user interface 900 may be executing in a print engine such as a network copier, a scanner, a facsimile, a computer, a handheld device, or other similar computing platform.

In 1110, the user may select the dictionary highlighting option on the user interface 900. The user interface 900 may be configured to display the list of categories, in step 1115.

In step 1120, the user selects a category for the document. The visual enhancement module 140 may be configured to process the document with the selected dictionary, in step 1125. More particularly, the document parser module 210 may be configured to store the dictionaries and the terms associated with each category in the memory 350 (See FIG. 3). In some embodiments, these categories may be referred to as look-up tables, linked lists, or other similar terms. The associated terms in the selected dictionary become a rule and the rule is processed similar to the processing associated with FIG. 4 (steps 435-455). Accordingly, the document parser module 210 may be configured to search for terms in the document that are contained in the selected dictionary.

In step 1130, a document parser module 210 may be configured to place the appropriate font emphasis on any matching terms found in the document. The font emphasis may be a rule associated with the term in some embodiments. In other embodiments, the font emphasis may be done at category selection and/or predetermined during creation of the dictionaries.

In step 1135, the visual enhancement module 140 may be configured to further process the document as described previously and produce copies of the document with the terms highlighted from the selected dictionary.

Figure 12:
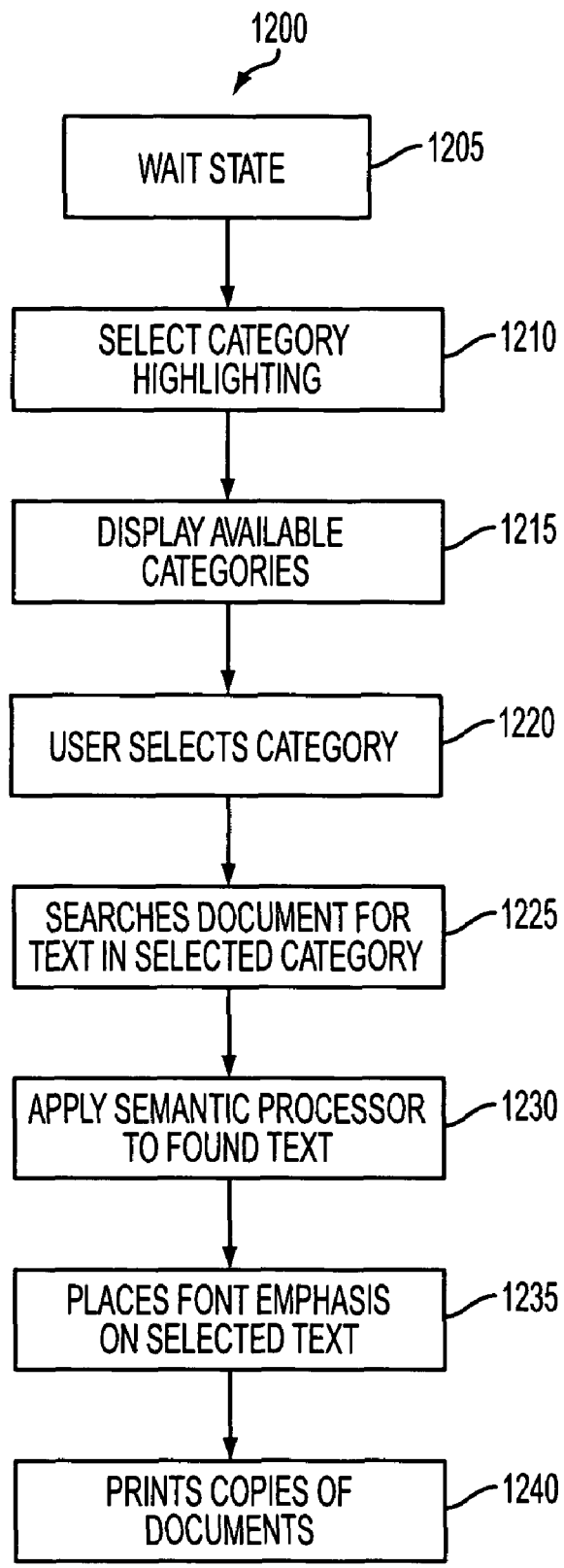
FIG. 12 illustrates another flow diagram for an embodiment of the user interface shown in FIG. 9.

FIG. 12 illustrates another flow diagram for an embodiment of the user interface shown in FIG. 9. It should readily apparent to those skilled in the art that FIG. 12 is a generalized illustration and that other steps may be added or existing steps may be removed or modified.

In yet another embodiment, a user may use a category feature in accordance with yet another embodiment of the invention. More particularly, categories may be created for users. Each category contains a list of pre-determined terms that are relevant for the category. Although similar to dictionaries, the category highlighting feature can distinguish between relevant terms and irrelevant terms. For example, a financial category may highlight any financial numbers. Although a document may contain financial numbers, e.g., sales for a quarter, the document also contains page numbers and/or dates. The category highlighting will only highlight the financial numbers based on a semantic processor in the color highlighting engine 220. The terms for the category may be predefined. However, in other embodiments, a user may create their own category. Thus, when a category is selected, the category terms are searched for in a document. For the matching terms in the document, a font emphasis, e.g., italicizing, bolding, highlighting, etc., is placed on the matching terms.

As shown in FIG. 12, the user interface 900 may be in a wait state, in step 1205. In some embodiments, the user interface 900 may be executing in a print engine such as a network copier, a scanner, a facsimile, a computer, a handheld device, or other similar computing platform.

In 1210, the user may select the category highlighting option on the user interface 900. The user interface 900 may be configured to display the list of categories, in step 1215.

In step 1220, the user selects a category for the document. The visual enhancement module 140 may be configured to process the document with the selected category, in step 1225. More particularly, the color highlighting engine 220 may be configured to process the print job stream with the rules executor module 540.

As one of the inputs to the rules executor module 540, the semantic processor 545 feeds the semantic rules for the terms in the category, in step 1230. Accordingly, the rules executor module 540 can distinguish between the relevant terms and the irrelevant terms.

In step 1235, a document parser module parser module 210 may be configured to place the appropriate font emphasis on any matching terms found in the document. The font emphasis may be a rule associated with the term in some embodiments. In other embodiments, the font emphasis may be done at category selection and/or predetermined during creation of the dictionaries.

In step 1240, the visual enhancement module 140 may be configured to further process the document as described previously and produce copies of the document with the terms highlighted from the selected dictionary.

Figure 13:
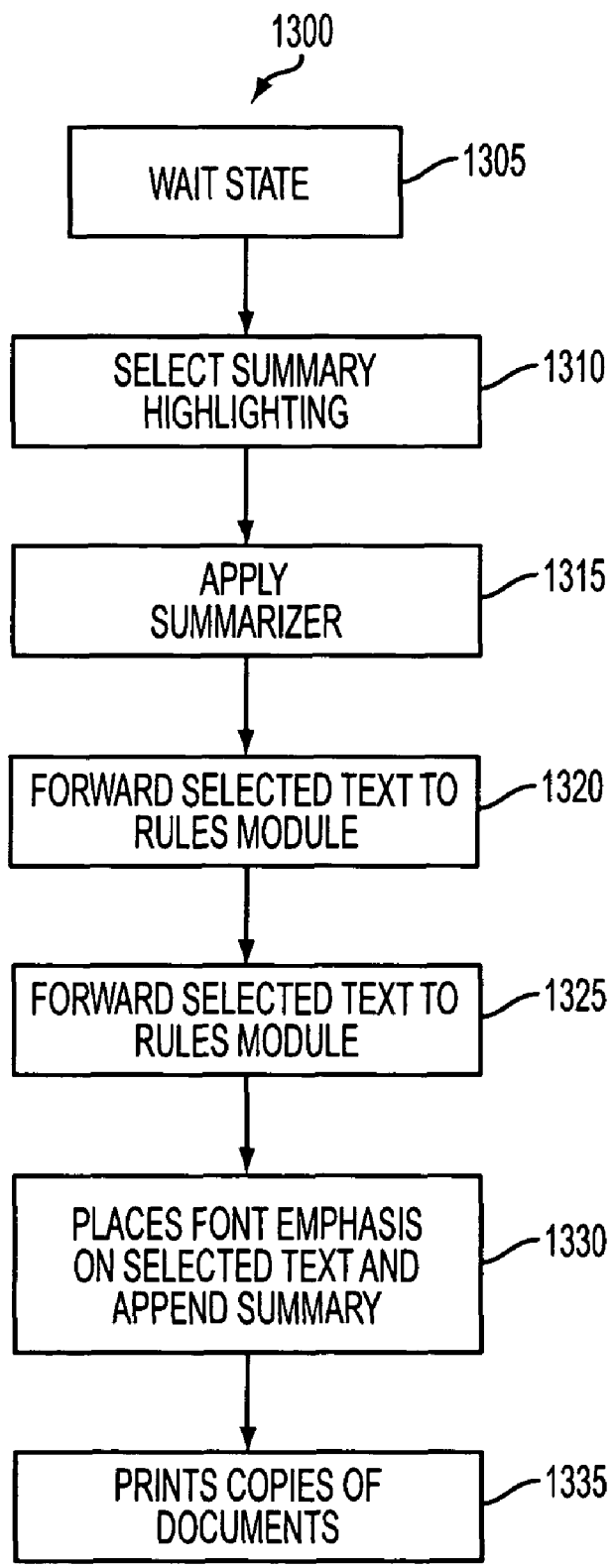
FIG. 13 illustrates yet another flow diagram for an embodiment of the user interface shown in FIG. 9.

FIG. 13 illustrates another flow diagram for an embodiment of the user interface shown in FIG. 9. It should readily apparent to those skilled in the art that FIG. 13 is a generalized illustration and that other steps may be added or existing steps may be removed or modified.

In yet another embodiment, a user may use a summary highlight feature in accordance with yet another embodiment of the invention. More particularly, the visual enhancement module 140 provides the capability to highlight key (or main) ideas in the document as well as provide a summary (or abstract) appended to the document. In other embodiments, the summary may be printed on a separate page. The visual enhancement module 140 may implement this feature by using the summarizer module 555 (see FIG. 5). The summarizer module 555 may use statistical and linguistic algorithms to accomplish the identification of key/main ideas.

As shown in FIG. 13, the user interface 900 may be in a wait state, in step 1305; In some embodiments, the user interface 900 may be executing in a print engine such as a network copier, a scanner, a facsimiles a computer, a handheld device, or other similar computing platform.

In 1310, the user may invoke the summary highlight feature on the user interface 900. In step 1315, the summarizer module 555 may process the print job data stream. More particularly, the CHE controller 510 may direct the print job data stream from the document parser module 210 to the summarizer module 555. The summarizer module 555 may be configured to determine the key (or main) ideas within the document as well as generate an abstract (or summary) of the document.

In step 1320, the summarizer module 555 may be configured to forward the selected text to the rules executor module 540 to insert the appropriate rule result for the selected text into the print job data stream. The CHE controller 510 may then forward the print job data stream to the document builder module 230 for further processing as previously described.

In step 1325, the document builder module 230 converts to the print job data stream to the native language of the selected print engine. The print engine may generate a hard copy of the print job data stream with the key ideas highlighted as well as a summary. In some embodiments, the summary is appended to the end of the document.

Figure 14:
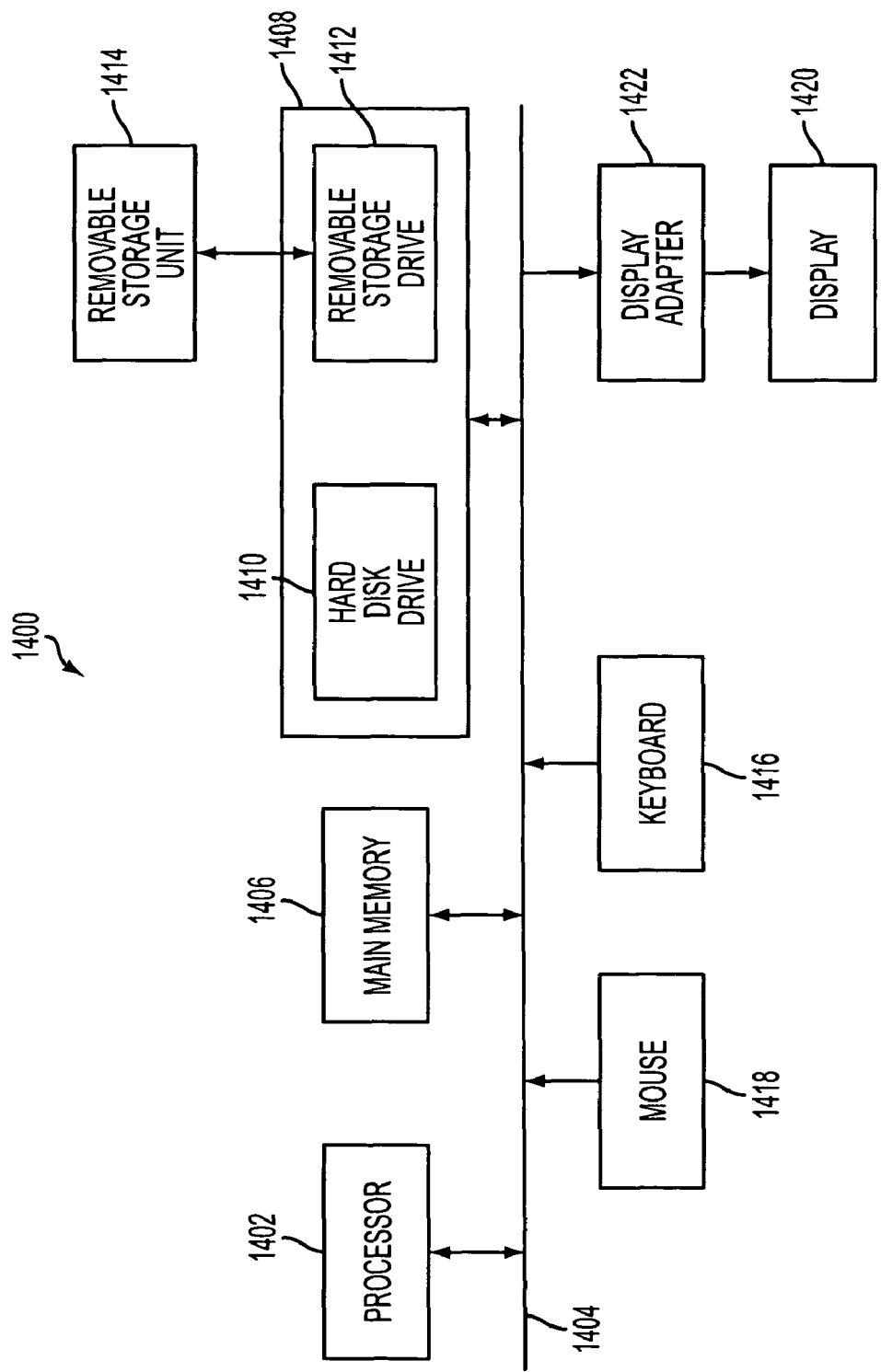
FIG. 14 illustrates an exemplary block diagram of a computing platform where an embodiment may be practiced.
Figure 15:
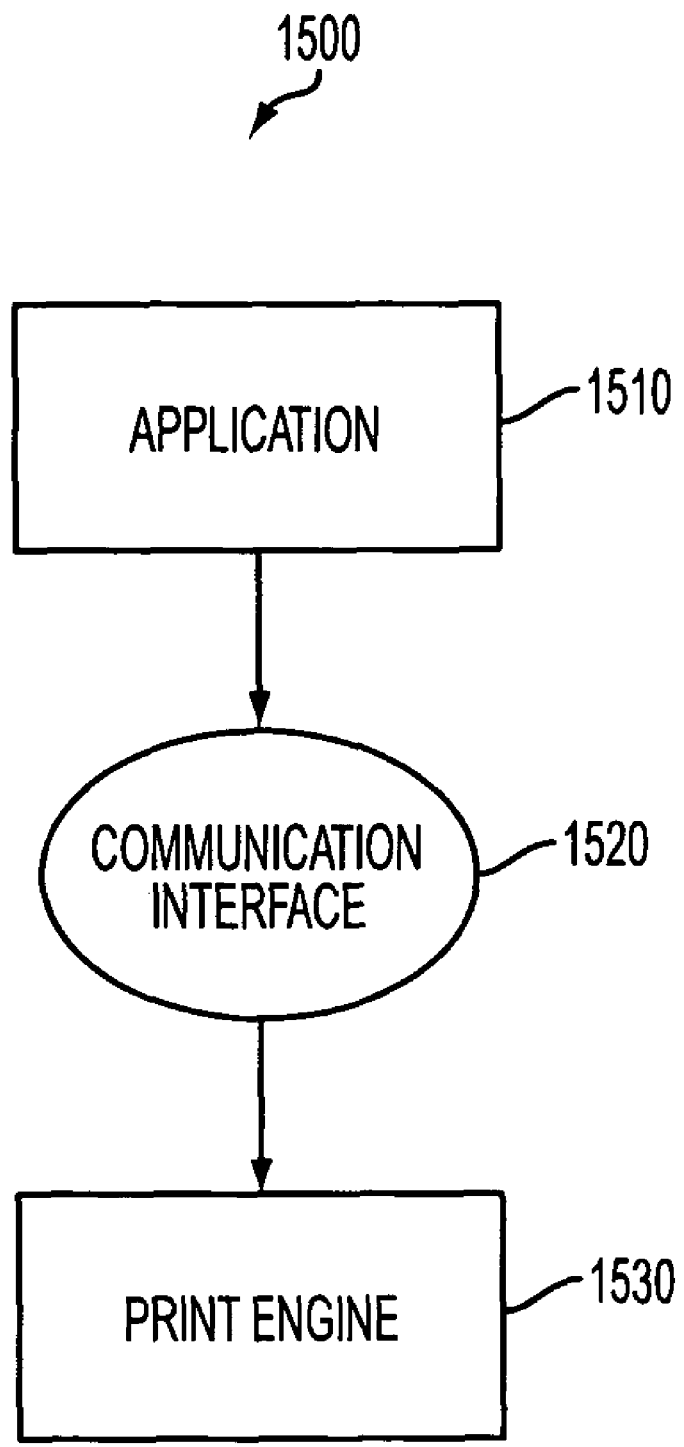
FIG. 15 illustrates a conventional work environment system.

FIG. 14 illustrates an exemplary block diagram of a computing platform 1400 where an embodiment may be practiced. The functions of the visual enhancement module may be implemented in program code and executed by the computing platform 1400. The visual enhancement module may be implemented in computer languages such as PASCAL, C, C++, JAVA, etc.

As shown in FIG. 14, the computer system 1400 includes one or more processors, such as processor 1402 that provide an execution platform for embodiments of the visual enhancement module. Commands and data from the processor 1402 are communicated over a communication bus 1404. The computer system 1400 also includes a main memory 1406, such as a Random Access Memory (RAM), where the software for the visual enhancement module may be executed during runtime, and a secondary memory 1408. The secondary memory 1408 includes, for example, a hard disk drive 1420 and/or a removable storage drive 1422, representing a floppy diskette drive, a magnetic tape drive, a compact disk drive, etc., where a copy of a computer program embodiment for the visual enhancement module may be stored. The removable storage drive 1422 reads from and/or writes to a removable storage unit 1424 in a well-known manner. A user interfaces with the expressway routing module with a keyboard 1426, a mouse 1428, and a display 1420. The display adaptor 1422 interfaces with the communication bus 1404 and the display 1420 and receives display data from the processor 1402 and converts the display data into display commands for the display 1420.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method for generating hardcopy output, the method comprising:
receiving a print job in a format native to a print engine;
receiving a print job description that modifies the print job in the format native to the print engine;
generating a modified print job of the print job by processing the print job with a rule associated with the print job description, wherein the modified print job is in the format native to the print engine, and wherein processing the print job comprises inserting an operation associated with the rule associated with the print job description in a meta-language format; and
transmitting the modified print job to the print engine.

2. The method according to claim 1, wherein processing the print job comprises marking the print job to delimit text within the print job based on the rule associated with the print job description.

3. The method according to claim 1, wherein processing the print job comprises marking the print job to delimit the rule associated with the print job description.

4. The method according to claim 1, further comprising:
processing an initial marked print job in the format native to the print engine according to the rule associated with the print job description.

5. The method according to claim 4, further comprising:
parsing the initial marked print job for marked portions;
removing text delimiters of the initial marked print job in response to a determination of at least one marked portion.

6. The method according to claim 1, further comprising:
processing a meta-language marked print job in response to the insertion of the operation; and
parsing the meta-language marked print job for meta-language formatted areas.

7. The method according to claim 6, further comprising:
replacing the meta-language formatted areas with a native format operation;
processing a final marked print job in response to the replacement of the meta-language formatted areas; and
transmitting the final marked print job to a print driver for print operation.

8. The method according to claim 1, further comprising:
receiving an indication of at least one textual item and an indication of at least one text highlight item associated with the at least one textual item; and
processing the print job description according to the at least one textual item and the at least one text highlight item.

9. The method according to claim 1, further comprising:
receiving an indication of a plurality of media outputs, an indication of at least one textual item, and an indication of a plurality of text highlight items for the least one textual item; and
associating one of the plurality of text highlight items with one of the plurality of media outputs.

10. A system for visually enhancing text, the system comprising:
a user interface configured to receive, from a user, a print job description that modifies a print job in a format native to a print engine, wherein the print job description comprises a selection for text associated with the print job and a selection of font emphasis for the selected text; and
a visual enhancement module configured to receive the print job from an application, wherein the print job is in the format native to the print engine; and generate a modified print job of the print job description in the format native to the print engine, wherein the visual enhancement module comprises a color highlighting engine configured to replace the selected text and a rule associated with the selected text with a color highlighting engine rule in a meta-format.

11. The system according to claim 10, wherein the print engine is configured to receive the modified print job and generate a hard copy output of the modified print job on a medium.

12. The system according to claim 10, wherein the visual enhancement module further comprises:
a document parser module; and
a document builder module.

13. The system according to claim 12, wherein the document parser module is configured to mark the selected text and a rule associated with the selected text in the format native to the print engine.

14. The system according to claim 12, wherein the document builder module is configured to replace the selected text and a rule associated with the selected text with a print engine rule in the format native to the print engine.

15. A system for visually enhancing text, the system comprising:
a user interface configured to receive a dictionary selection that modifies a print job in a format native to a print engine, the dictionary selection comprising at least one predetermined term; and
a visual enhancement module configured to receive the print job from an application, wherein the print job is in the format native to the print engine; and generate a modified print job of the print job by placing a font emphasis on an occurrence of the at least one predetermined term in the print job, wherein the modified print job is in the format native to the print engine, and wherein the visual enhancement module comprises a color highlighting engine configured to replace the at least one predetermined term and a rule associated with the at least one predetermined term with a color highlighting engine rule in a meta-format.

16. A method for generating a hardcopy output, the method comprising:
receiving a print job in a format native to a print engine;
receiving a dictionary selection that modifies the print job in the format native to the print engine, wherein the dictionary selection comprises at least one predetermined term; and
generating a modified print job of the print job by placing a font emphasis on an occurrence of the at least one predetermined term in the print job, wherein the modified print job is in the format native to the print engine, and wherein placing the font emphasis comprises inserting an operation in a meta-language format.

17. A system for visually enhancing text, the system comprising:
a user interface configured to receive a category option selection that modifies a print job in a format native to a print engine, the category option selection comprising at least one rule for determining a relevant term; and
a visual enhancement module configured to receive the print job from an application, wherein the print job is in the format native to the print engine; and generate a modified print job of the print job by processing the print job with the at least one rule to place a font emphasis on an occurrence of the relevant term in the print job, wherein the modified print job is in the format native to the print engine, and wherein the visual enhancement module comprises a color highlighting engine configured to replace the relevant term and a rule associated with the relevant term with a color highlighting engine rule in a meta-format.

18. A method for generating a hardcopy output, the method comprising:
generating a print job from one of an application and an image file of a document, wherein the print job is in a format native to a print engine;
receiving a category selection that modifies the print job in the format native to the print engine, the category selection comprising at least one rule for determining a relevant term; and
generating a modified print job of the print job by processing the print job with the at least one rule to place a font emphasis on an occurrence of the relevant term in the print job, wherein the modified print job is in the format native to the print engine, and wherein processing the print job comprises inserting an operation associated with the at least one rule in a meta-language format.

19. A system for visually enhancing text, the system comprising:
a user interface configured to receive a summary option selection that modifies a print job in a format native to a print engine, the summary option selection comprising at least one rule for determining a main idea; and a visual enhancement module configured to receive the print job from one of an application and an image file of a document, wherein the print job is in the format native to the print engine, and generate a modified print job of the print job by processing the print job with the at least one rule to place a font emphasis on an occurrence of the main idea in the print job, wherein the modified print job is in the format native to the print engine, and wherein the visual enhancement module comprises a color highlighting engine configured to replace the main idea and a rule associated with the main idea with a color highlighting engine rule in a meta-format.

20. A method for generating a hardcopy output without modifying an original document, the method comprising:

generating a print job from one of an output from an application and an image file of a document, wherein the print job is in a format native to a print engine;

receiving a summary option selection that modifies the print job in the format native to the print engine, the summary option selection comprising at least one rule for determining a key point in the print job and generating a summary of the print job; and generating a modified print job of the print job by processing the print job with the at least one rule to place a font emphasis on the key point of the print job and to append the summary to the print job, wherein the modified print job is in the format native to the print engine, and wherein processing the print job comprises inserting an operation associated with the at least one rule in a meta-language format.

21. A method of generating a hardcopy output without modifying an original document, the method comprising:

generating a print job from one of an output from an application and an image file of a document, wherein the print job is in a format native to a print engine;

receiving a copy variation selection that modifies the print job in the format native to the print engine, the copy variation selection comprising parameters to individualize a plurality of copies of the print job;

generating a plurality of modified print jobs of the print job by processing the print job with the parameters to place an emphasis on portions of the print job according to the parameters, wherein the modified print jobs are in the format native to the print engine, and wherein processing the print lob comprises inserting an operation associated with the parameters in a meta-language format; and printing the plurality of copies of the print job according to the plurality of modified print jobs.

\* \* \* \* \*